Oct. 21, 1947.   J. L. STEVENS   2,429,377
FLY TRAP
Filed Jan. 24, 1944
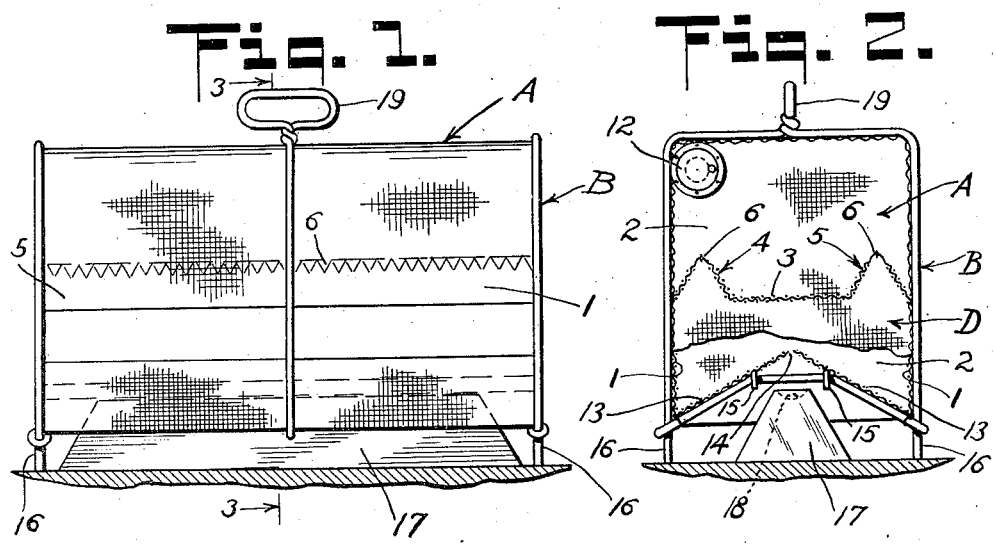
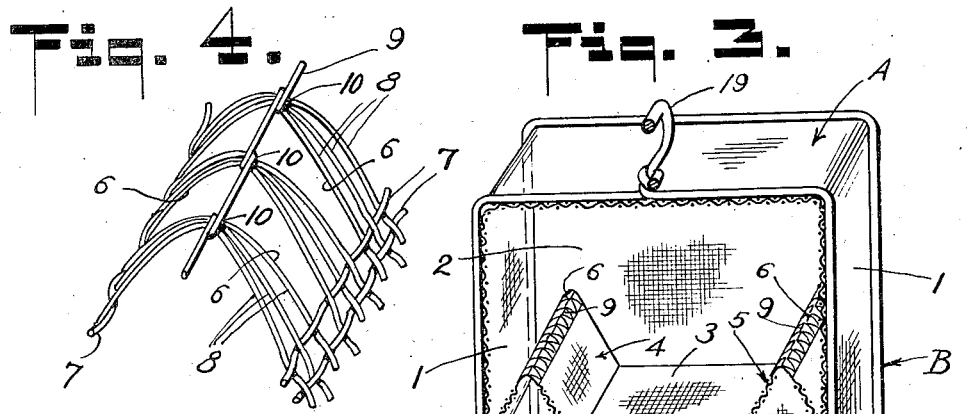
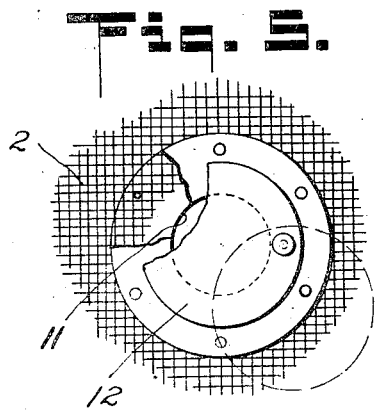
Inventor
JOHN L. STEVENS
By R. S. Berry
Attorney Patented Oct. 21, 1947

2,429,377

UNITED STATES PATENT OFFICE 2,429,377

FLYTRAP

John L. Stevens, Lomita, Calif.

Application January 24, 1944, Serial No. 519,547

7 Claims. (Cl. 43—118)

This invention relates to traps for catching flies and other insects and has for an object the provision of an improved trap of simple and inexpensive construction by means of which insects may be readily and easily trapped and wherein the trap is extremely light as to weight and of compact form subject to being readily and easily transported, shipped and stored and has a large capacity in consideration of its size.

Another object of my invention is to provide an insect trap of the character described which may be conveniently and inexpensively made for the most part of ordinary wire or like woven screening supported on a simple skeleton frame and has no moving parts nor requires the use of heavy, expensive, or strategic materials.

Another object of my invention is to provide a new and advantageous formation of insect entrance openings in woven screening which assures a ready entrance of the flies or insects into the trap yet effectively prevents the escape of the insects through such openings.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 1 is a side elevation of an insect trap embodying my invention;

Fig. 2 is a fragmentary end elevation of the trap with the lower part broken away and other parts shown in section;

Fig. 3 is a cross section taken on the line 3—3 of Fig. 1 and shown in perspective and on a larger scale than in Figs. 1 and 2;

Fig. 4 is an enlarged fragmentary perspective view, on a still larger scale of the insect entrance opening formation in the screen, this part of the structure being shown in a somewhat diagrammatic manner in Figs. 2 and 3.

Fig. 5 is an enlarged fragmentary elevational view showing the door for removing flies which have been exterminated in the trap.

It should be noted that my particular entrance opening formation in a wire or other woven screen wall or part of a wall of an insect trapping cage is subject to use in various types of trap cages and is not limited to use in a cage such as shown in the accompanying drawing and hereinafter described. However, I have found that excellent results may be obtained when using my novel entrance opening formation in a cage of the type here shown which of itself embodies features of novelty and improvement as will become apparent as the description hereof progresses.

Referring now more specifically to the trap shown in the accompanying drawing, A designates the main trapping cage or compartment which is made of wire or other woven screen material including screen walls 1, 2 and 3 of desired mesh and supported by a rigid skeleton frame B of wire or other suitable material.

The screen bottom wall 3 as here shown is formed with integral elongated screen portions 4 and 5 of substantially an approximate inverted V-shape, along its longitudinal margins. The outermost sides of said inverted V-portions are shown slightly concave in their apical portions (see Fig. 4), where the special fly entrance openings 6 are formed.

Insect entrance openings 6 are formed in the apical or ridge portions of the screen portions 4 and 5, which ridge portions have only one longitudinal strand 9 in spaced relation to the regularly woven strands 7. These regular screen strands lie opposite sides of the ridge portions. Extending from the ridge strands 9 are groups of inclined strands 8 which join with the regularly woven strands 7 and together with strands 9 and the strands 7 define the margins of the openings 6. These formations may be provided by removing from the screening which forms the portions 4 and 5 several of the longitudinal strands and using two of them to form the ridge strands 9 and to tie the strands 8 in groups as shown in Fig. 4.

To tie the strands 8 and pull them together in groups so as to form the entrance openings 6, the ridge strands 9 are looped around successive groups of the strands 8, for example, three strands per group, and pulled tight so that the strands of each group converge to tight knots 10. In pulling the groups together to form the knots the openings 6 are provided between the tied groups of strands and these openings are of greater length transversely of the inverted V formations 5 and 6, and increase in width from the smaller ends thereof farthest removed from the ridges strand 9 toward the ridges strand.

The flies will crawl or fly upwardly relative to the flat convergent surfaces afforded by the concave sides of the formations 4 and 5 and will pass readily through the openings 6 into the cage or compartment A. The entrance of the flies through the openings 6 is enhanced by the fact that the openings increase in width toward the apices or ridges of the formations 4 and 5. However, when the flies inside the cage alight on or near the ridge seeking exit, the particular ridge strand 9, the knots 10 and spreading strands 8 of each group and particularly openings 6 present a hazard that thwarts attempts to escape as I have proven with many tests. Flies trapped in the cage A may be exterminated in any suitable manner after which the dead flies are removed through a discharge opening 11 in one of the end walls 2 of the cage, there being a pivoted door 12 for opening and closing the discharge opening.

I have found that where the openings 6 are formed as shown in Fig. 4 in combination with the ridge strand 9 and the strands 8 spreading divergently from the knots 10 towards the smaller ends of the openings and the latter have greater length than width and are just wide enough to freely admit a fly at the apex or ridge of the inverted V-formation, the flies will readily enter the trap but in crawling downward from the ridge strand as is the habit of flies, or in crawling upward over the strands 8 toward the ridge, are thwarted by this formation in some manner and do not escape through the openings 6.

Considering the other features of my trap, I have, as here shown, provided the trap with a sub-trapping cage or compartment D below the main cage A, the side and end walls 1 and 2 of the main cage being extended to form the side walls of the sub-cage. A screen bottom wall 13 in two sections forms an inverted V-shaped wall for the sub-cage while the wall 3 serves as a partition between the two cages. The inner edges of the two sections of the wall 13 are spaced apart to form a fly entrance slot 14 which opens into the sub-cage D. The frame B includes longitudinal supporting bars 15 supporting the bottom wall sections 13. Any suitable means may be employed to secure the screen walls to the frame B and bars 15.

As here provided the frame B has four legs 16 for supporting the trap above the ground or other surface over which the trap is placed.

An inverted V-shaped bait support 17 may be placed under the bottom wall 13 and suitable bait, not shown, placed in a concaved top 18 of the support to attract the flies. The bait support 17 and bottom wall 13 form inverted V-shaped channels or passages promoting the flying or crawling of the flies up to and through the entrance slot 14 and into the sub-cage D from which latter the flies will enter the main cage A through the openings 6 as hereinbefore described.

A handle 19 is conveniently formed as a part of the frame B to facilitate placement and other necessary handling of the cage.

It should be noted that the entrance openings 6 and associated parts of the screen material provide an effective means for inducing flies to pass through the openings 6 in but one direction while excluding the passage of the flies through the openings in the opposite direction.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a fly trap, a trapping cage, an elongated woven screen of approximately an inverted V-shape in cross section constituting a part of a wall of the cage and arranged with its apical portion directed toward the interior of the cage, said screen having strands which extend longitudinally thereof and strands which extend transversely thereof, the strands which extend transversely of said screen forming the apical portion of the screen, one of said longitudinal strands being a ridge strand extending longitudinally of and forming a part of the apical portion of the screen and being looped around groups of the transverse strands at spaced intervals along the apex of the screen and holding portions of the transverse strands of each group closely together so that other portions of the strands of each group will converge toward said ridge strand, whereby fly entrance openings are defined between said groups of transverse strands, and means affording the removal of flies which have been exterminated in said cage.

2. In a fly trap, a trapping cage, an elongated woven screen of approximately an inverted V-shape in cross section constituting a part of a wall of the cage and arranged with its apical portion directed toward the interior of the cage, said screen having strands which extend longitudinally thereof and strands which extend transversely thereof, the strands which extend transversely of said screen forming the apical portion of the screen, one of said longitudinal strands being a ridge strand extending longitudinally of and forming a part of the apical portion of the screen and being looped around groups of the transverse strands at spaced intervals along the apex of the screen and holding portions of the transverse strands of each group closely together so that other portions of the strands of each group will converge toward said ridge strand, whereby fly entrance openings are defined between said groups of transverse strands, and means affording the removal of flies which have been exterminated in said cage, said entrance openings being narrower at the ends thereof farthest removed from said ridge strand and increasing in width toward said ridge strand.

3. In a fly trap, a trapping cage, an elongated woven screen of approximately an inverted V-shape in cross section constituting a part of a wall of the cage and arranged with its apical portion directed toward the interior of the cage, said screen having strands which extend longitudinally thereof and strands which extend transversely thereof, the strands which extend transversely of said screen forming the apical portion of the screen, one of said longitudinal strands being a ridge strand extending longitudinally of and forming a part of the apical portion of the screen and being looped around groups of the transverse strands at spaced intervals along the apex of the screen and holding portions of the transverse strands of each group closely together so that other portions of the strands of each group will converge toward said ridge strand, whereby fly entrance openings are defined between said groups of transverse strands, and means affording the removal of flies which have been exterminated in said cage, each of said openings being elongated in a direction transversely of said screen and having greater width adjacent the ridge strand than at the outer end thereof.

4. In a fly trap, a trapping cage, an elongated woven screen of approximately an inverted V-shape in cross section constituting a part of a wall of the cage and arranged with its apical portion directed toward the interior of the cage, said screen having strands which extend longitudinally thereof and strands which extend transversely thereof, the strands which extend transversely of said screen forming the apical portion of the screen, one of said longitudinal strands being a ridge strand extending longitudinally of and forming a part of the apical portion of the screen and being looped around groups of the transverse strands at spaced intervals along the apex of the screen and holding portions of the transverse strands of each group closely together so that other portions of the strands of each group will converge toward said ridge strand, whereby fly entrance openings are defined between said groups of transverse strands, and means affording the removal of flies which have been exterminated in said cage, said openings being elongated and having a portion thereof of such small size as to prevent the entrance of a fly therethrough and another portion of a size sufficient to admit the passage of a fly therethrough.

5. In a fly trap, an elongated woven screen of approximately an inverted V-shape in cross section, said screen having strands which extend longitudinally thereof and strands which extend transversely thereof, portions of the strands which extend transversely of said screen forming the apical portion of the screen, and elongated means extending along the ridge of said apical portion and attached to groups of said portions of the transverse strands at spaced intervals along the apex of the screen to hold the apical portions of the strands of each of said groups closely together thereby forming downwardly tapering fly entrance openings between adjacent said groups.

6. In a fly trap, a strip of screen wire of approximately an inverted V-shape in cross section positioned with its apical portion directed toward the space to which the flies are to be conducted, there being a series of openings in said screen along each side of said apical portion, said openings being elongated and gradually reduced in width from the ends thereof nearer to said apical portion to the other ends thereof, and a part of said screen constituting means defining margins of said openings along said apical portion, said means being fastened to the other screen portions along said apical portion.

7. The subject matter of claim 6 and said means consisting of a piece of wire.

JOHN L. STEVENS.

REFERENCES CITED

The following references are of record in the file of this patent:

UNITED STATES PATENTS

| Number | Name | Date |
| --- | --- | --- |
| 138,797 | Ernst et al. | May 13, 1873 |
| 1,320,017 | Lurz | Oct. 28, 1919 |
| 1,091,717 | Terhune | Mar. 31, 1914 |
| 1,082,358 | Price | Dec. 23, 1913 |